United States Patent
Flood

(10) Patent No.: US 6,630,915 B1
(45) Date of Patent: Oct. 7, 2003

(54) WIRELESS TRANSMISSION SYSTEM FOR TRANSMITTING DATA TO A SIMULATION SYSTEM USER

(75) Inventor: Kevin M. Flood, Exton, PA (US)

(73) Assignee: LSA, Inc., Arlington, VA (US)

( * ) Notice: Subject to any disclaimer, the term of this patent is extended or adjusted under 35 U.S.C. 154(b) by 0 days.

(21) Appl. No.: 09/236,605

(22) Filed: Jan. 26, 1999

(51) Int. Cl.$^7$ .............................. G09G 5/00; G02B 27/14
(52) U.S. Cl. ........................................... 345/8; 359/630
(58) Field of Search ................................ 345/7–9, 121, 345/139, 158; 359/13, 630, 632, 152; 250/206.2, 559.29

(56) References Cited

U.S. PATENT DOCUMENTS

| | | | | |
|---|---|---|---|---|
| 4,649,504 A | * | 3/1987 | Krouglicof et al. ......... 702/153 |
| 4,866,229 A | * | 9/1989 | Scharfenberg ............ 250/203.3 |
| 5,359,446 A | * | 10/1994 | Johnson et al. ............. 359/152 |
| 5,406,415 A | * | 4/1995 | Kelly ........................... 359/633 |
| 5,485,172 A | * | 1/1996 | Sawachika et al. ............. 345/8 |
| 5,671,158 A | * | 9/1997 | Fournier et al. ................ 345/8 |
| 5,708,449 A | * | 1/1998 | Heacock et al. ................ 345/8 |
| 5,717,414 A | * | 2/1998 | Bergsneider et al. ........... 345/8 |
| 5,742,263 A | * | 4/1998 | Wang et al. ..................... 345/8 |
| 5,757,339 A | * | 5/1998 | Williams et al. ................ 345/8 |
| 5,759,044 A | * | 6/1998 | Redmond ................. 434/307 R |
| 5,767,524 A | * | 6/1998 | Barbier et al. .......... 250/559.29 |
| 6,140,981 A | * | 10/2000 | Kuenster et al. ................ 345/8 |
| 6,157,291 A | * | 12/2000 | Kuenster et al. ................ 340/8 |

OTHER PUBLICATIONS

F.J. Ferrin, "Survey of Helmet Tracking Technologies" SPIE Proceedings: Large–Screen Projection–Avionics and Helmet–Mounted Displays, No. 145, p. 86–94, (Jan. 25, 1991).

* cited by examiner

Primary Examiner—Bipin Shalwala
Assistant Examiner—Jeff Piziali

(57) ABSTRACT

A wireless transmission system for transmitting data to a user in a simulation system includes a light source for generating a modulated light beam for transmitting the data, an active pointing mechanism for actively pointing the light source, an optical receiver carried by the user for receiving and demodulating the modulated light beam, and a display or audio source for using the data to provide stimuli to the user. The light source preferably includes a laser device which is intensity-modulated with a wave form appropriate for the audio and video interfaces being used. The active pointing mechanism preferably includes a two-dimensional gimbal which receives tracking information from a tracking detector that tracks the optical receiver, and which uses that tracking information to actively point the light source. User position and head orientation are wirelessly tracked via optical sensors or feedback from user-worn sensor data.

29 Claims, 6 Drawing Sheets

WIRELESS TRANSMISSION SYSTEM FOR TRANSMITTING DATA TO A SIMULATION SYSTEM USER

This invention was made with Government support under contracts F30602-95-C-0165 and F30602-96-C-0183 awarded by the United States Air Force. The Government has certain rights in the invention. The U.S. Government has a paid-up license in this invention and the right in limited circumstances to require the patent owner to license others on reasonable terms as provided by the terms of F30602-95-C-0165 and F30602-96-C-0183 awarded by the United States Air Force.

BACKGROUND OF THE INVENTION

1. Field of the Invention

The invention relates in general to simulation systems for providing stimuli to a mobile user with a head-mounted display, and in particular to a novel system for transmitting data to a user, receiving control inputs from the user, and transmitting user position and/or orientation information in a wireless manner.

2. Related Art

Various simulation systems are known for providing a simulated environment, in the form of audio and visual cues, to a user in applications such as training, system or building design, entertainment, and other applications that allow users to explore the simulated three-dimensional aspects of entities or environments. Such systems typically include a processor for generating data describing the virtual environment, means for converting the data into electrical signals containing audio and video information, a head-mounted display for providing visual cues in accordance with such signals, speakers or headphones for providing audio cues in accordance with such signals, and user-input devices for providing feedback which is used by the processor to update the data which it generates.

U.S. Pat. No. 5,671,158 to Fournier et al. discloses an apparatus and method for wireless and interactive communication between a computer and a technician. The computer is equipped with video and audio transmitters, and an audio receiver. The technician wears a portable user interface, including a communication pack with a video receiver, audio receiver, audio transmitter, and battery pack. The interface also includes a helmet equipped with a video display, microphone, and headphones.

PCT Publication No. WO 94/11855 to Kuenster et al. discloses a video display system that includes a heads-up display and portable electronic device for projecting an enlarged virtual image of video information depicted on a video display wherein the virtual image is viewable by a user wearing the head-up display unit. The portable device includes a receiver for receiving radio-frequency-modulated video and audio signals and is coupled to the video display unit. Additionally, the portable device may be mounted on the frame of the heads-up display unit.

U.S. Pat. No. 5,717,414 to Bergsneider et al. discloses a video image tracking system for determining the position and orientation of an operator with respect to a simulator display. The system further includes a device for locating the detectable object within the simulator display and communicates this location to a VR system which displays the proper orientation and location of the virtual environment with respect to the operator.

Other references generally illustrative of the art of head-mounted displays used in virtual reality systems and related communications systems include U.S. Pat. No. 4,649,504 to Krouglicof, U.S. Pat. No. 4,866,229 to Scharfenberg, U.S. Pat. No. 5,406,415 to Kelly, U.S. Pat. No. 5,485,172 to Sawachicka et al., U.S. Pat. No. 5,671,158 to Fournier, et al., U.S. Pat. No. 5,742,263 to Wang et al., U.S. Pat. No. 5,757,339 to Williams et al., and U.S. Pat. No. 5,767,524 to Barbier et al.

OBJECTS AND SUMMARY OF THE INVENTION

Systems such as those described above for providing audio and visual cues to a user are subject to various limitations, including poor or non-existent support for multiple users, the possibility that a signal transmitted to a user will be improperly intercepted, low bandwidth of the transmission path between the processor and the user, high cost, restrictions on a user's movement, and susceptibility to interference.

It is therefore an object of the invention to provide an improved system for providing visual and audio cues to a user.

It is a further object of the invention to provide a system for transmitting visual and audio cues in a wireless manner to a mobile user with improved bandwidth in the transmission path between the virtual reality processor and the user.

It is a further object of the invention to provide a system which wirelessly tracks a user's location, head orientation, and/or orientation of appendages or attached objects.

It is a further object of the invention to provide a system for providing visual and audio cues to a user which is less susceptible to interference or interception of the signal between the processor and the user.

It is a further object of the invention to provide a system for providing visual and audio cues to a user which is less costly to manufacture.

It is a further object of the invention to provide a system for providing visual and audio cues to a user which provides fewer restrictions on user movement.

In a preferred embodiment, the invention provides a wireless transmission system for transmitting data to a user in a simulation system, the transmission system including a light source for generating a modulated light beam for transmitting the data, an active pointing mechanism for actively pointing the light source, an optical receiver carried by the user for receiving and demodulating the modulated light beam, and a display or audio source for using the data to provide stimuli to the user. The light source preferably includes a laser device which is intensity-modulated with a wave form appropriate for the audio and video interfaces being used. The active pointing mechanism preferably includes a two-dimensional gimbal which receives tracking information from a tracking detector that tracks the optical receiver, and which uses that tracking information to actively point the light source. A virtual reality processor processes position and orientation data and outputs video data and audio data for wireless transmission to the user's head-mounted display and audio headset.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
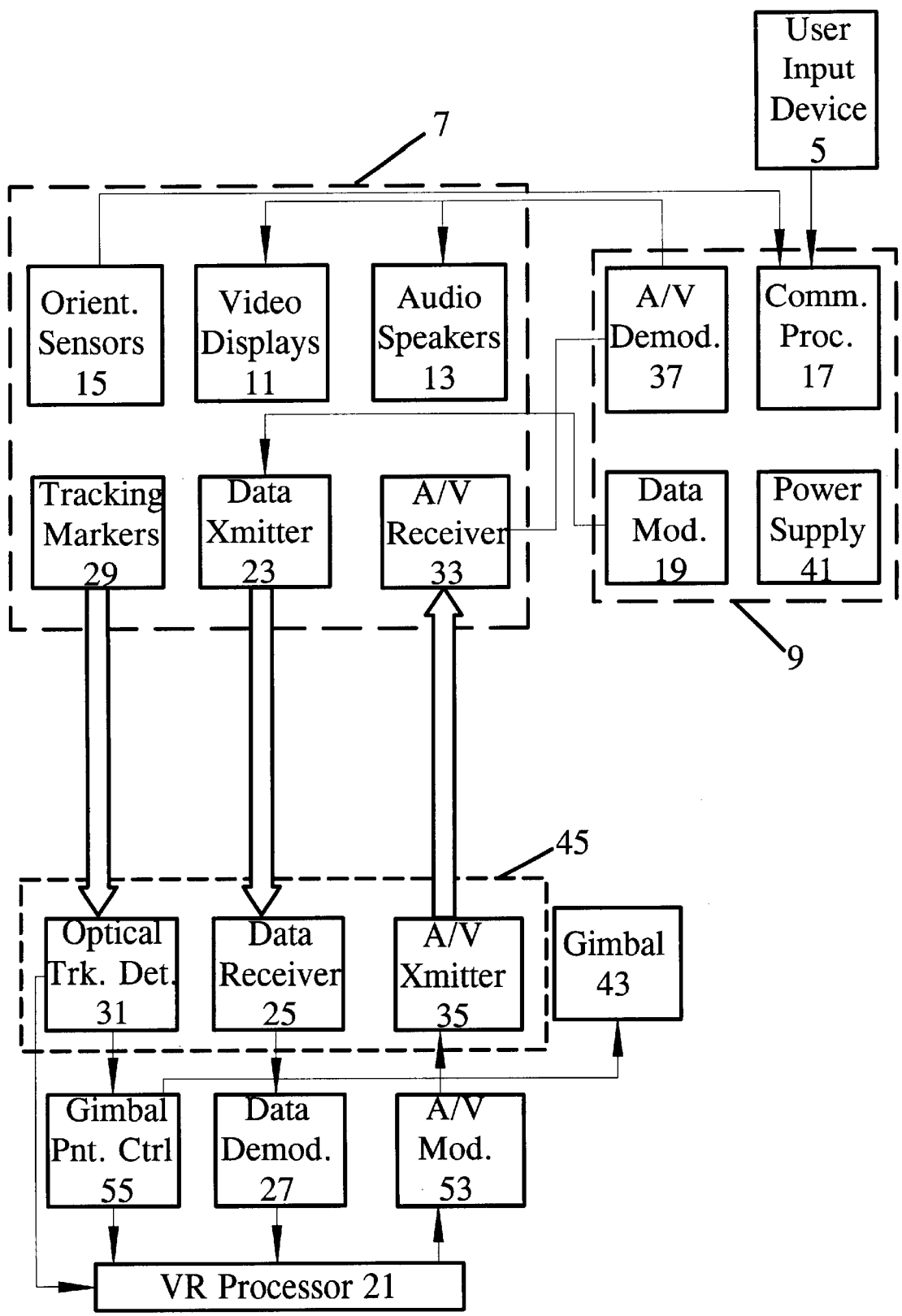
FIG. 1 shows a schematic block diagram illustrating the invention according to a preferred embodiment.
Figure 2:
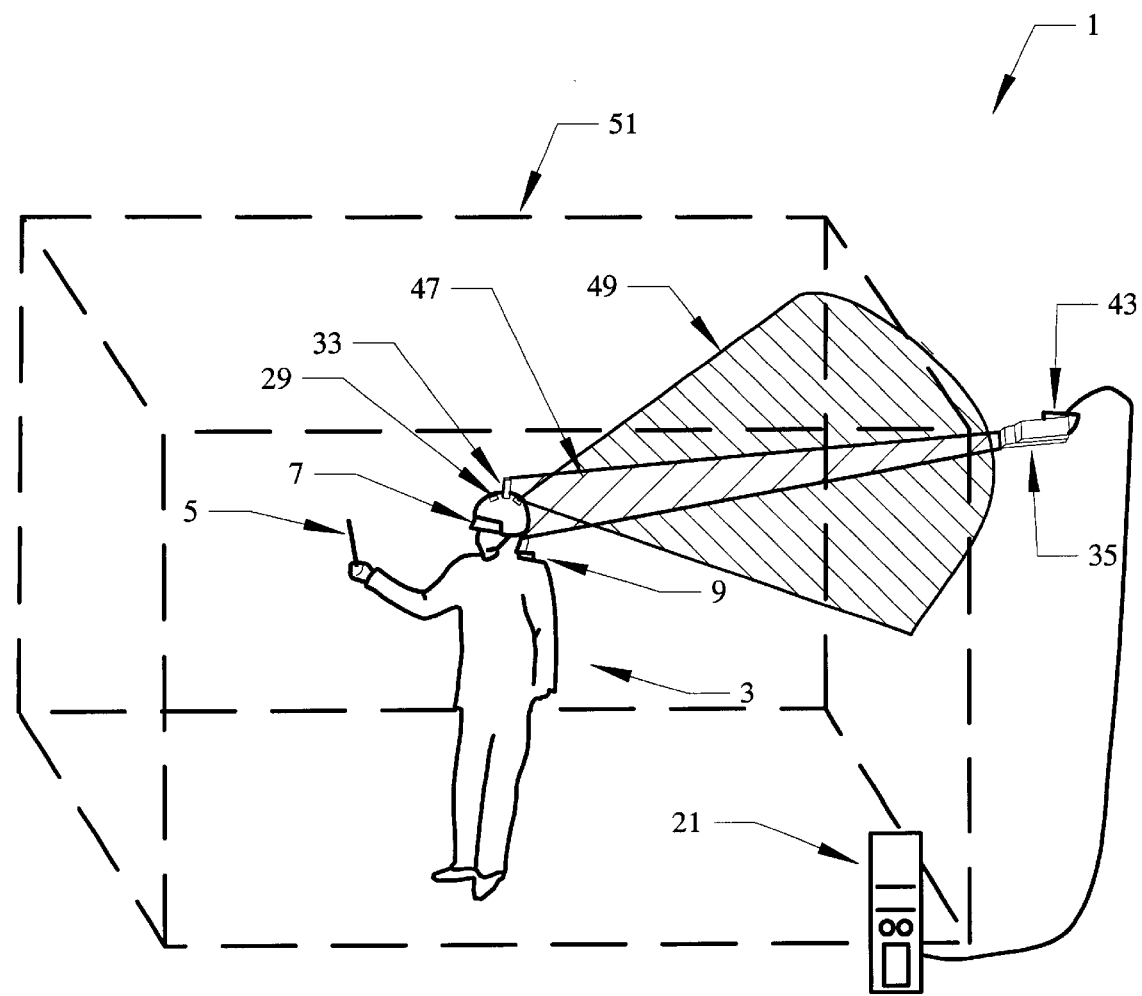
FIG. 2 shows a perspective view illustrating certain features of the system of the invention according to a preferred embodiment.

FIGS. 1 and 2 show a block diagram and a perspective view, respectively, illustrating the invention according to a preferred embodiment. The invention includes a simulation system 1 for providing interaction stimuli including visual and audio cues to one or more virtual-reality users 3 who interact with a computationally derived virtual environment, the boundary of which is shown at 51, via a head-mounted display (HMD) 7, personal audio receiver, position and orientation sensors 15, and one or more electronic input devices 5. The audio and video stimuli respond to user movements, such as orientation of the user's head position and the user's position within the environment, orientation of a user's appendages, and to feedback provided by the user through a user input device 5, which may be a joystick or other input device.

The head-mounted display 7 is worn by the virtual-reality user 3 and provides a means by which several functional elements are physically attached to the user's head. Such elements preferably include, e.g., an omnidirectional audio/video receiver, data transmitters, tracking markers, video displays, and audio speakers, each of which is discussed in further detail below. An electrical connection is provided between the head-mounted display 7 and a user pack 9. This electrical connection transmits communication and control signal between the user pack and the head-mounted display, and provides power to the head-mounted display.

The head-mounted display 7 preferably includes a pair of video displays 11, one for each of the user's eyes, for presenting video stimuli to the user 3. The video displays 11 can be provided in the form of various appropriate technologies, including but not limited to liquid crystal displays (LCD's), electroluminescent displays (ELD's), field emissive devices (FED's), cathode ray tubes (CRT's), virtual-retinal displays (VRD'S), digital micro-mirror displays, or other display technology suitable for headset integration.

The personal audio receiver includes, e.g., one or more audio speakers 13, mounted on the user or at fixed positions in the simulation space, for presenting audio stimuli to the user. The audio speakers 13 may take the form of various audio technologies as appropriate for headset integration or fixed speaker usage.

A virtual-reality processor 21 generates visual and audio data which is used to provide visual and audio stimuli to the user via the user's head-mounted display 7 and the personal audio receiver. Feedback to the virtual-reality processor 21 is provided from the position sensors, orientation sensors, and electronic input device 5, and the processor uses such feedback to modify the visual and audio data accordingly.

In its preferred embodiment, the invention provides a system wherein video and audio data is transmitted from the virtual-reality processor 21 to the head-mounted display 7 and audio receivers by means of a high-data-rate, wireless optical communication link 47. The transmission means for the optical communication link 47 preferably comprises a laser transmitting device 35 which is intensity-modulated with a wave form appropriate for the audio and video interfaces being used. The laser transmitting device 35 is actively pointed in the direction of the user-mounted receiver 33 so as to provide sufficient power density at the receiver and prevent reception of the signal by more than one user. An optical tracking detector 31 associated with the laser device 35 tracks optical tracking markers 29 mounted near the receiver and causes a two-dimensional gimbal 43 to actively point the laser transmitting device 35, which is mounted on the gimbal, toward the tracking markers.

A separate user-position-tracking function is preferably provided and is derived from the optical tracking detector 31 (which determines the user position) and orientation sensors 15. The user-position-tracking function provides feedback to the virtual-reality processor 21, whereby the processor can update the audio and video stimuli provided to the user.

The virtual-reality processor 21 further receives feedback from the tracking markers 29 and electronic input devices 5 via a wireless data link 49. A data transmitter 23 for the wireless data link broadcasts sensor and input device information throughout the simulation space. A data receiver 25, which may or may not be collocated with the transmitter 35 for the audio and video communication link, detects the information and communicates it to the virtual reality processor 21. As discussed in further detail below, the wireless data link 49 may be provided in the form of, e.g., an optical or radio frequency (RF) transmitter and receiver.

Feedback of inertial-tracking data from multiple, simultaneous users may be supported by means of time-division multiplexing or frequency multiplexing. In embodiments wherein an optical wireless data link is used, the data link receiver is preferably located on the same pointing mechanism as the laser transmitter for the audio and video communication link. In RF embodiments, the RF receiver may be positioned anywhere within a suitable distance from the RF transmitter associated with the tracking sensors and electronic input devices, and the user pack 9 may also house the data transmitter.

The orientation sensors 15 preferably comprise inertial sensors which produce signals that can be interpreted to determine the orientation of the user's head in three angular degrees of freedom. The orientation sensors 15 may comprise, e.g., tilt-sensors, compasses, magnetometers, inclinometers, gyroscopes, or accelerometers, or any combination thereof. In a preferred embodiment, an electronic compass, e.g., a magnetometer, is provided for establishing an absolute reference direction and a combination of gyroscopes, linear accelerometers, and inclinometers are provided for determining orientation values. Sensors for detecting the orientation of a user's appendages may also be provided. Signals from the orientation sensors are processed by a communication processor 17, are formatted by a data modulator 19, are transmitted by a data transmitter 23 over a wireless link to a data receiver 25, are demodulated by a data demodulator 27, and are then received by the virtual-reality processor 21.

The tracking markers 29 are provided in the preferred embodiment in the form of optical radiators which serve as reference sources for an optical tracking detector 31. The tracking markers 29 may comprise, e.g., light emitting diodes, lasers, or other appropriate optical source. The intensity of light emitted by such optical radiators may be modulated to provide additional processing discrimination against the ambient light background. The wavelength of the emitted light is preferably different from that of the data transmitter 23 and the audio/video transmitter 35 so that the signals from each of these sources may be optically filtered by the appropriate receiver.

The position-tracking function of the present invention may be provided in the form of various alternative technologies such as, e.g., acoustic or electromagnetic tracking technologies or other technologies which can be supported by a wireless interconnection between the marker, i.e., the source being tracked and the sensor. The marker may also be provided in the form of a passive device such as an optical reflector used in combination with a laser ranging device. Other applicable helmet-tracking technologies are described in F. J. Ferrin, "Survey of Helmet Tracking Technologies," SPIE Proceedings: Large-Screen Projection-Avionics, and Helmet-Mounted Displays 1456,86–94 (1991), the entire disclosure of which is incorporated herein by reference.

The data transmitter 23 provides a means for wirelessly transmitting data, which has been compiled by the communication processor 17 and processed and formatted by the data modulator 19, from the user 3 to the virtual-reality processor 21. Such data includes, e.g., orientation data from the orientation sensors 15 and input data from the user input device 5. The data transmitter 23 may comprise, e.g., an infrared or RF wireless modem. According to the preferred embodiment, the optical tracking markers 29 also function as the data transmitter by emitting intensity-modulated beams.

The audio/video receiver 33 preferably comprises a quasi-omnidirectional optical receiver capable of detecting modulated optical signals from an audio/video transmitter 35 and converting them to electrical signals. These signals are then received by an audio/video demodulator 37 which converts them into control signals which can be interpreted by the video displays 11 and audio speakers 13. The audio/video receiver 33 is preferably provided in the form of a wideband multi-element optical receiver, which is discussed in further detail below. The audio/video receiver 33 is preferably mounted on the user's headset.

The user pack 9 preferably comprises a physical attachment worn by the virtual reality user 3 and serves to house processing electronics, a communication demodulator, the data modulator 19, and the power supply 41. The user pack 9 is attached to the head-mounted display 7 and the user input device 5 via appropriate electrical interconnections. Information paths among the functional elements contained in the user-worn equipment are preferably provided by means of electrical connections between the user pack 9 and the head-mounted display 7 and between the user pack 9 and the user-input device 5. The user pack 9 can be provided in the form of any of several suitable forms of attachment, such as a hard- or soft-framed backpack, belt packs, or shoulder harnesses.

The communication processor 17 preferably comprises a microcontroller, interface controller, or micro-computer, which is housed in the user pack 9 and is programmed to process and interpret signals received from the orientation sensors 15 and the user-input device 5. The communication processor 17 combines processed signals from the orientation sensors 15 and the user-input device 5 in a digital format. This data is then modulated by the data modulator 19 and transmitted, via the data transmitter 23, to the virtual reality processor 21.

The data modulator 19 accepts data from the communication processor 17 and generates an information-bearing electrical signal whose format is suitable for transmission to the virtual reality processor 21 via the data transmitter 23. An optical output of the tracking markers 29 is preferably modulated with the signal from the data modulator 19, whereby two functions are combined into common components.

The power supply 41 preferably comprises a battery source with appropriate electrical regulators to produce the electrical voltages required to support all of the electrical components of the head-mounted display 7, the user pack 9, and the user input device 5.

The user input device 5 provides an additional input mechanism which is used by the virtual-reality user 3 to convey information back to the virtual reality processor that cannot be conveyed through body movements. Typical user input devices include, e.g., a joystick, track ball, flying mouse, wand, pointer, microphone, etc. The communication processor formats the data from the user input device prior to modulation by the data modulator 19 and transmission by the data transmitter 23.

The virtual-reality processor 21 is the highest level processing element in the system and generates, through software, the virtual scene that is observed by the virtual-reality user. The video and audio information composing the scene are communicated to the audio/video modulator 53, which prepares the data for transmission to the user 3. The virtual-reality processor 21 also receives data regarding the user's distance from the gimbal 43 (from the optical tracking detector 31), the pointing direction of the gimbal 43 (from a gimbal pointing control 55), the user's head orientation (from the data demodulator 27), and feedback from the user input device 5 (from the data demodulator 27). The processor updates the virtual scene based on these inputs.

The gimbal pointing control 55 is an autonomous processing element whose function is to maintain the directed laser beam on the audio/video receiver. The gimbal pointing control 55 is electrically connected to the virtual-reality processor 21, which can direct the gimbal to a starting position to initiate a virtual interaction or terminate the operation of the system and thereby disable the autonomous operation of the gimbal. The gimbal pointing control 55 communicates its angular position data to the virtual-reality processor 21 in order that the processor can determine the user's position (from the angular position information and range information from the optical tracking detector 31). The gimbal pointing control 55 is also electrically connected to the gimbal, gimbal payload, and ultimately the optical tracking detector. The gimbal pointing control 55 processes the data from the optical tracking detector 31 and directs the gimbal to change its angular position in order to keep the laser beam directed at the target. This control may be analog or digital in nature, depending upon the type of motor control needed for the gimbal used.

The data demodulator 27 accepts information-bearing electrical signals from the data receiver and generates digital data. The digital data are processed by the demodulator in order that the virtual-reality processor 21 can interpret the data, which contain information regarding the orientation of the head-mounted display 7 and feedback from the user input device 5. The data demodulator 27 formats the data so it can be used directly by the virtual-reality processor 21. In most scenarios, the data are conveyed in a digital format. In some instances, however, the user-input device 5 produces analog signals, and the input to the virtual-reality processor 21 must be in the same analog format. Such is the case for certain joysticks and some audio inputs. In these cases, the data demodulator 27 formats the signals in the appropriate analog form.

The audio/video modulator 53 accepts video and audio data from the virtual-reality processor 21 and generates a signal in an electrical signaling format suitable for use by the audio/video transmitter 35. In general, the audio/video modulator 53 accepts a minimum of eight analog signals from the virtual-reality processor 21. These correspond to six video signals (a Red, green, and Blue (RGB) signal for each of the two video displays) and two audio signals (i.e., stereo audio).

The audio/video modulator 53, in addition to producing an appropriate signaling format, should first combine the multiple signals so they can be accommodated by the audio/video transmitter 35. In the preferred embodiment, the audio/video transmitter 35 communicates via a single communications channel. Therefore, the modulator should multiplex all eight signals on a single channel for proper transmission. This can be accomplished through a number of known multiplexing means, the most common of which are frequency-division multiplexing (FDM), time-division multiplexing (TDM), or code-division multiplexing (CDM).

TDM and CDM require the signals first to be converted from analog to digital format before multiplexing. This results in a significant increase in the required communications bandwidth to transmit all of the data. An alternative is to digitally compress the data before transmission (as with MPEG algorithms used for high-definition digital video), but this may result in a transmission latency which is unacceptable for this real-time application. Therefore, FDM is the preferred multiplexing format. For the FDM format, the video and audio signals may first be modulated using amplitude modulation (AM) or frequency modulation (FM) and then combined, or they may be shifted in frequency to non-overlapping bands and combined.

The audio/video transmitter 35 accepts modulated electrical signals from the audio/video modulator 53 and imparts the signals on a laser beam for transmission to the audio/video receiver 33. The preferred embodiment uses an intensity modulation format in which the intensity of the laser beam is modulated according to the format of the modulated audio/video signal. The audio/video transmitter 35 also comprises beam shaping optics that produce a laser beam with the desired characteristics, e.g., the desired beam divergence and initial beam diameter and shape.

The gimbal 43 is the physical mechanism which points the audio/video transmitter 35 at the audio/video receiver 33. The particular gimbal selected should support the mass and moment of the inertia of the gimbal payload and should slew sufficiently quickly to keep the beam on the mobile user during the worst-case user movements. Support for multiple simultaneous users may be provided through the use of multiple gimbals, with each gimbal dedicated to a particular user.

The gimbal payload 45 is the mechanical assembly that is attached to the gimbal 43 and preferably includes the optical tracking detector 31, data receiver 25, audio/video transmitter 35, and the mechanical assemblies required to attach these items to the gimbal 43. The payload also has integral alignment mechanisms required to perform static pointing adjustments of the optical tracking detector 31, data receiver 25, and audio/video transmitter 35. Alternative embodiments which use multiple optical data receivers or wireless RF data receivers would preferably not include the data receiver on the gimbal payload.

The optical tracking detector 31 preferably comprises a single-element or multiple-element detector used to determine the range to the virtual-reality user 3 and the pointing direction for the gimbal 43. In the preferred embodiment, the optical tracking detector 31 comprises two position-sensing cameras (i.e. cameras with position-sensing detectors or pixelized focal-plane arrays) which triangulate the position to the tracking markers 29 and output data on the angle-of-arrival of the optical signal from the markers 29. The angle-of-arrival data is processed by the virtual reality processor 21 to determine the user's location in the simulation space. The angle-of-arrival data can also be processed by the gimbal controller and used by the controller to determine the direction which it will command the gimbal to point.

The data receiver 25 senses the information-bearing optical signals sent by the data transmitter 23 and converts the signals into an electrical format suitable for processing by the data demodulator 27. The data receiver may use radio-frequency technology instead of optics. Alternative embodiments using multiple optical data receivers or wireless RF data receivers preferably do not include the data receiver on the gimbal payload.

Figure 3:
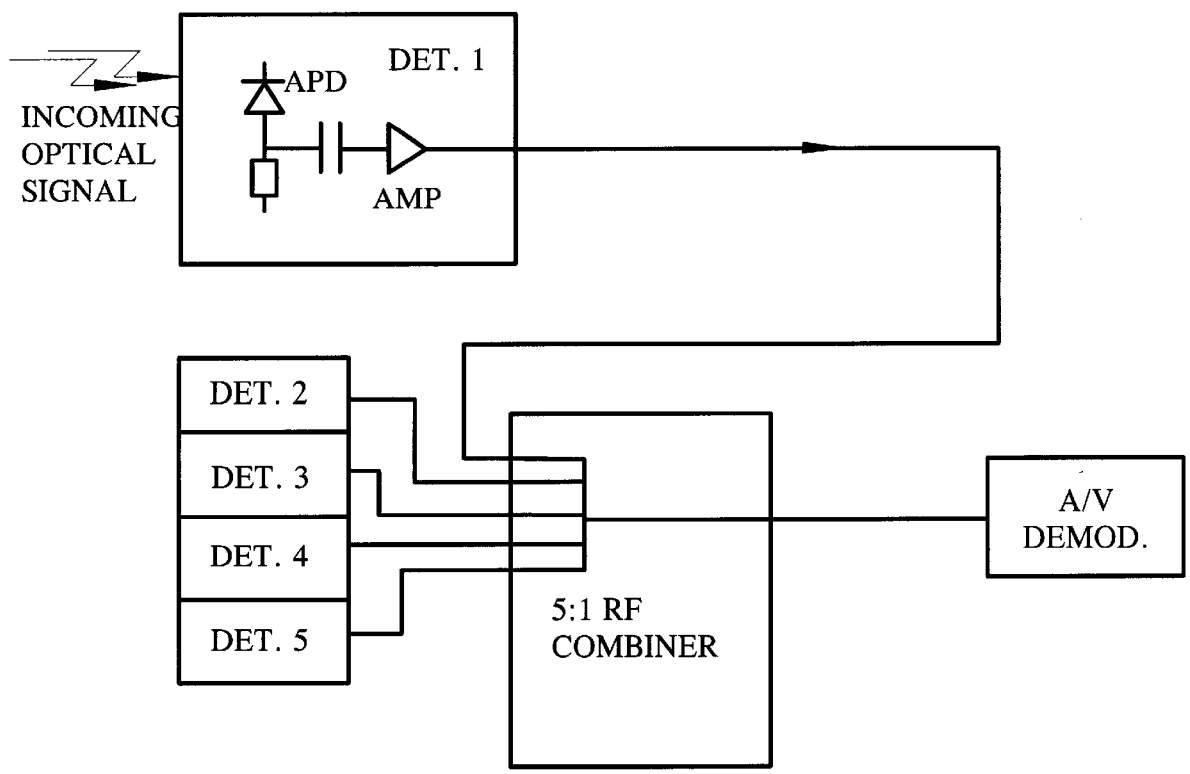
FIG. 3 shows a schematic block diagram illustrating baseline audio/video receiver details according to a preferred embodiment of the invention.

FIG. 3 is a schematic block diagram illustrating baseline audio/video receiver details according to a preferred embodiment of the invention. In this embodiment, the audio/video receiver is a multi-element optical receiver that provides the capability to detect optical signals with wideband intensity modulation. The multi-element nature of the device provides an unobscured field-of-view throughout the simulation volume regardless of the user's orientation or position.

The multi-element receiver as shown in FIG. 3 comprises five wideband optical detectors arranged in a package such that at least one detector can receive the optical signal from any given direction. For example, the detectors may be arranged such that four detectors form a square, each facing out, and the fifth detector faces upward. Five detectors are used for packaging convenience and to provide overlap in the detector coverage areas, but three or four detectors may be sufficient for this purpose, depending upon the exact application of the invention.

In FIG. 3, detector "Det. 1" is shown in detail and the remaining detectors are shown in block form. Each optical detector comprises an avalanche photodiode (APD) such as the EG&G Optoelectronics C30902S, an amplifier such as the Hewlett Packard INA-02170, and supporting circuitry. The electrical outputs from the multiple optical detectors are combined using a suitable RF combiner circuit, such as the Mini Circuits surface-mount SCP-5-1 device. The combined signal is delivered, via wired electrical connections, to the audio/video demodulator, which resides in the user pack. The audio/video demodulator converts the combined signals from the five detector elements to baseband audio and video signals with appropriate signal levels to drive the video displays 11 and audio speakers 13 (FIG. 1).

Figure 4:
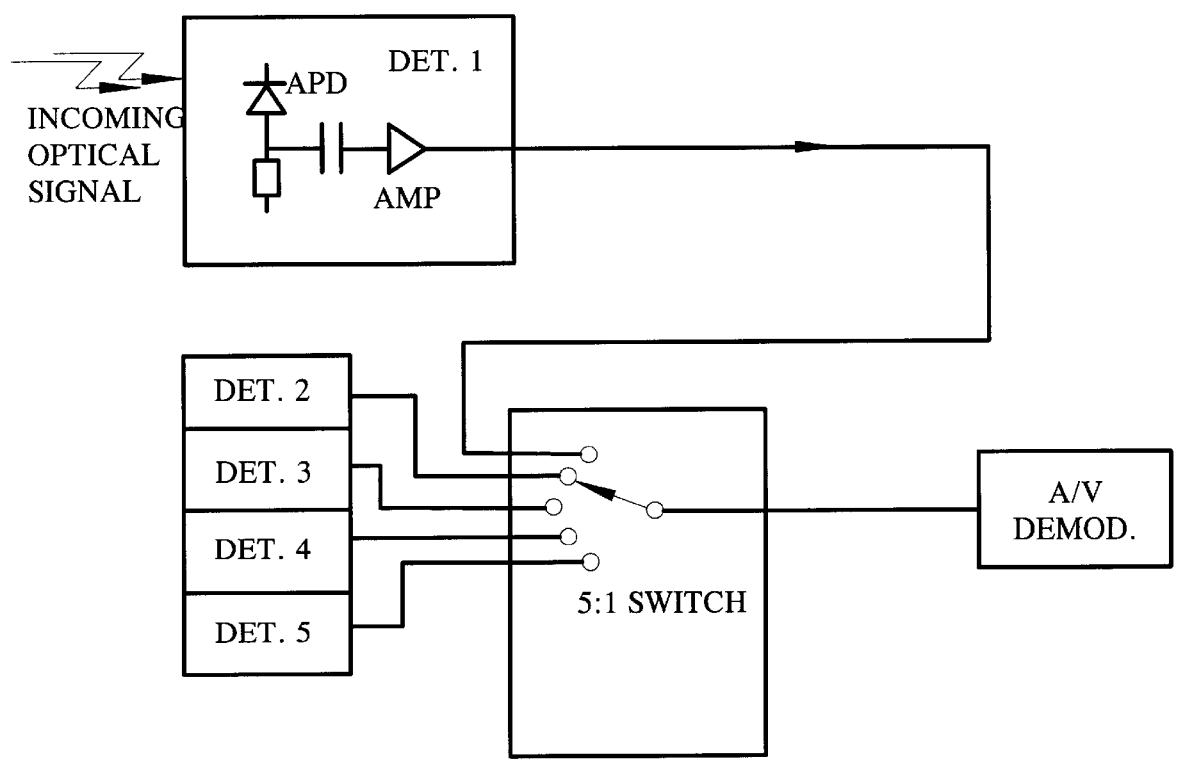
FIG. 4 shows a schematic block diagram illustrating baseline audio/video receiver details according to an alternative embodiment.

FIG. 4 shows a schematic block diagram illustrating baseline optical audio/video receiver details according to an alternative embodiment. In this embodiment, the audio/video receiver includes processing capability to select the reciever element or elements having the strongest signals. The receiver then connects the strongest signal(s) to the demodulator while the weaker signals are preferably terminated. This embodiment has the advantage of not integrating the background noise produced by the detector elements that are not illuminated by the signal beam.

Figure 5:
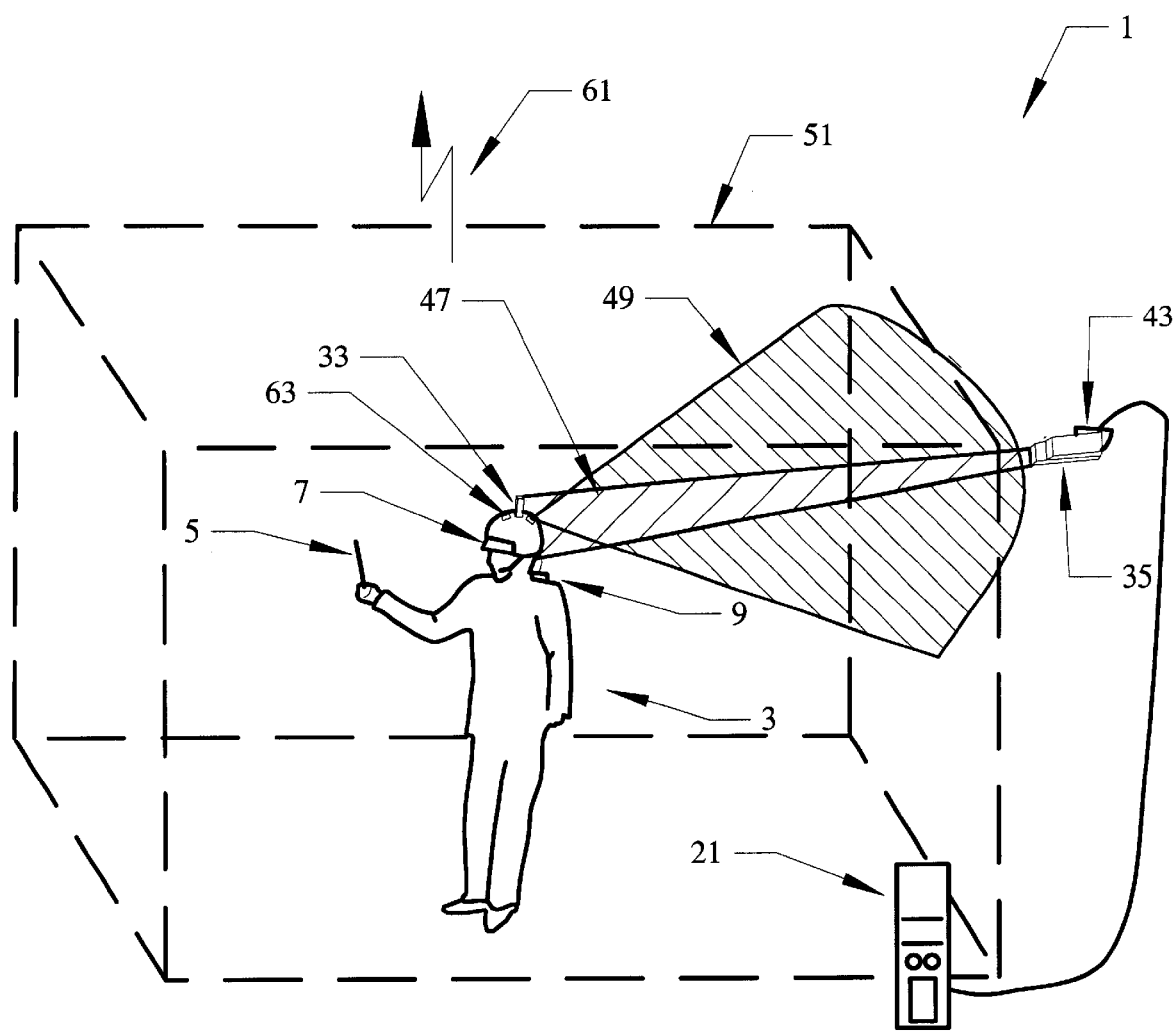
FIG. 5 shows a perspective view illustrating certain features of the system of the invention according to an alternative embodiment.

FIG. 5 shows a perspective view illustrating certain features of the system of the invention according to an alternative embodiment wherein electromagnetic or acoustic tracking means are used to track the position of the user's head orientation and position. A tracking transmitter 61, which may be an electromagnetic or acoustic transmitter, is located within the simulation space and emits signals that are received by suitable tracking detectors 63 located on the user 3, preferably on the head-mounted display 7. Signals from the detectors 63 are processed by the communication processor 17 (FIG. 1) in the user pack and are transmitted back to the virtual reality processor 21 (FIG. 1) via the wireless data link.

In the embodiment of FIG. 5, the gimbal pointing control 55 (FIG. 1) may operate on information fed back from the tracking detectors 63 via the wireless link, or may use an optical tracking means to autonomously determine its pointing direction separately from the computation of the user's position.

Figure 6:
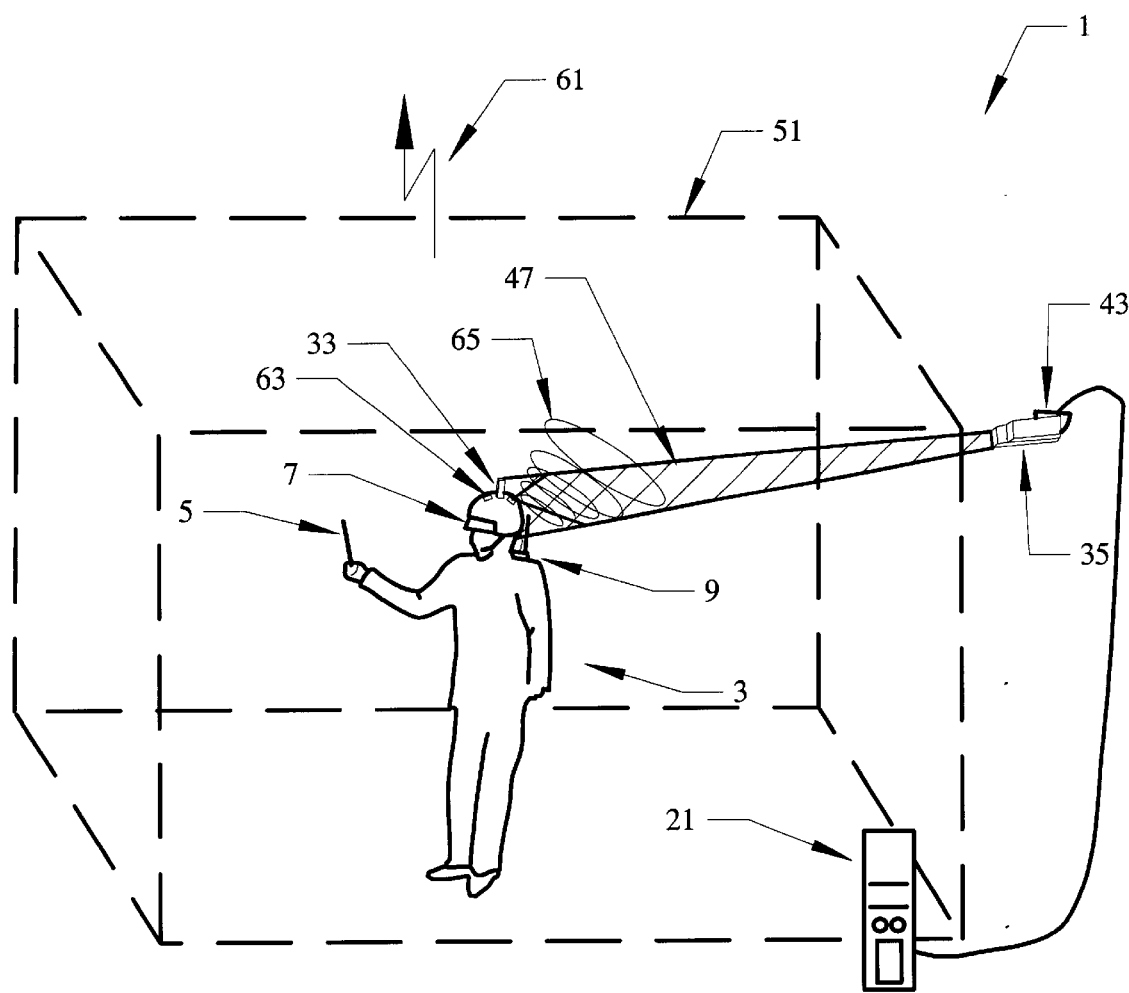
FIG. 6 shows a perspective view illustrating certain features of the system of the invention according to an alternative embodiment which includes an RF wireless data link.

FIG. 6 shows a perspective view illustrating certain features of the system of the invention according to an embodiment of the invention which includes an RF wireless data link as an alternative to the optical data link. In this embodiment, an RF transmitter transmits data from the tracking detectors via an RF signal 65. In this embodiment, the data receiver may be positioned off the gimbal payload. FIG. 6 shows a system which uses an electromagnetic tracker, but it will be recognized that other tracking technologies, particularly alternative tracking technologies disclosed herein, could be used in this RF data link embodiment without departing from the spirit and scope of the invention.

In another alternative embodiment, the position-tracking detector 31 (FIG. 1) which is used for determining the pointing position of the transmitter 35 is used also as the receiver for the wireless data link 49. According to another alternative embodiment, the separate optical tracking detector is eliminated and the information from the position-tracking sensors 15 is used also to point the directional modulated laser which carries the video and audio information.

As an alternative to the actively-pointed laser communication link discussed above, a divergent, i.e., broadcast laser beam without active tracking may be provided. In such an embodiment, multiple users can be supported through the use of frequency-multiplexed, optical subcarrier signals or through time-division multiplexing.

In a further alternative embodiment, the wireless video and audio link may be provided by means of multiple laser sources at various positions and orientations throughout the simulation space to communicate with a single user who's position and orientation varies with time. In such an embodiment, the multiple laser sources may be operated at different times or simultaneously. This embodiment provides advantages in that the rate of data transmission from any given source is minimized and redundancy is provided in the event that a particular source becomes blocked.

The system of the invention is broadly applicable to simulation, training, system design, and other applications that allow users to explore the simulated three-dimensional aspects of entities or environments. The invention is particularly well-suited to applications which benefit from increased user mobility, such as home design, training for military or law enforcement organizations, and entertainment.

While the invention has been particularly shown and described with reference to preferred embodiments thereof, it will be understood by those skilled in the art that various changes in form and details may be made therein without departing from the spirit and scope of the invention.

The embodiments of the invention in which an exclusive property or privilege is claimed are defined as follows:

1. A real-time virtual-reality simulation system for providing three-dimensional real-time video and stereo audio stimuli to a mobile user in a simulation space, comprising:
    a wireless transmission system for wirelessly transmitting three-dimensional real-time video and stereo audio digital data to said user and wirelessly receiving tracking data from said user in a data communication rate of at least 295 Mbps,
    said wireless transmission system including a signal projector having a transmitter for generating a modulated light beam so as to transmit said digital data, and a tracker for actively tracking said mobile user so as to direct said digital data said mobile user and thereby update said digital data to correspond with a viewing orientation of said user; and
    a user module carried by said mobile user having at least one optical receiver for wirelessly receiving and demodulating said modulated light beam and at least one optical transmitter for wirelessly transmitting said tracking data corresponding to said viewing orientation of said user to said projector, and a converter for converting said demodulated light beam to said stimuli to said user,
    wherein said wireless transmission system is operatively connected to said user module so as to simulate a virtual-reality environment for said user who roams freely in the simulation space, and said at least one optical receiver is operatively formed so as to un-obstructively receive said modulated light beam and to maintain direct communication between said signal projector and said optical receiver via said tracker.

2. The simulation system according to claim 1, wherein said transmitter generates a modulated laser beam.

3. The simulation system according to claim 1, wherein said tracker includes a two-dimensional gimbal.

4. A real-time virtual-reality simulation system for providing three-dimensional real-time video and stereo audio stimuli to a mobile user in a simulation space, comprising:
    a processor for processing position and orientation data and for outputting three-dimensional real-time video and stereo audio digital data in a data communication rate of at least 295 Mbps;
    a directional wireless transmitter for transmitting at least said video digital data via a modulated light beam;
    a wireless head-mounted display device having at least one video receiver for remotely receiving said video digital data from said transmitter, and the display device converts said video digital data into said video stimuli for said user;
    at least one wireless audio receiver for remotely receiving said stereo audio digital data and for translating said stereo audio digital data into stereo audio stimuli for said user;
    a sensor for tracking user position and orientation and for generating position and orientation data; and at least one wireless data link transmitter for transmitting said position and orientation data to said processor, wherein said user roams freely in a virtual-reality environment simulated by the system within the simulation space, and said wireless transmitter is operatively connected to said display device so as to simulate the virtual-reality environment for said user, and said video receiver is operatively formed so as to un-obstructively receive said modulated light beam and to maintain direct communication between said wireless transmitter and said video receiver via said sensor.

5. The simulation system according to claim 4, wherein said wireless transmitter includes an optical transmitter.

6. The simulation system according to claim 5, wherein said optical transmitter includes an actively pointed laser.

7. The simulation system according to claim 4, wherein said audio receiver is mounted to said user.

8. The simulation system according to claim 4, wherein said audio receiver is mounted in said simulation space.

9. The simulation system according to claim 4, wherein said sensor is an inertial sensor.

10. The simulation system according to claim 1, wherein a front end of the optical receiver is formed to minimize internal noise generated therein.

11. The simulation system according to claims 4, wherein a front end of at least one of the video receiver and the audio receiver is formed to minimize internal noise generated therein.

12. The simulation system according to claim 10, wherein the front end operates within a noise floor range of 4.29–19.2 nW up to 200 MHz.

13. The simulation system according to claim 10, wherein said front end includes a photodetector and a preamplifier.

14. The simulation system according to claim 13, wherein the photodetector is an avalanche photodiode.

15. The simulation system according to claim 13, wherein the preamplifier is a transimpedance amplifier.

16. The simulation system according to claim 1, wherein said at least one receiver includes a RF combiner for summing electrical output signals of each module of said at least one receiver into a single signal to be delivered to an audio/video demodulator.

17. The simulation system according to claim 10, wherein the front end operates at a noise floor of 5.89 nW up to 200 MHz.

18. The simulation system according to claim 10, wherein the front end operates at a noise floor range of 96–435 nW at 13.5 dB SNR.

19. The simulation system according to claim 11, wherein the front end operates within a noise floor range of 4.29–19.2 nW up to 200 MHz.

20. The simulation system according to claim 11, wherein said front end includes a photodetector and a preamplifier.

21. The simulation system according to claim 20, wherein the photodetector is an avalanche photodiode.

22. The simulation system according claim 20, wherein the a preamplifier is a transimpendance amplifier.

23. The simulation system according to claim 4, wherein one of the video receiver and the audio receiver includes a RF combiner for summing electrical output signals of each module of at least one of said video receiver and said audio receiver into a single signal to be delivered to an audio/video demodulator.

24. The simulation system according to claim 11, wherein the front end operates at a noise floor of 5.89 nW up to 200 MHz.

25. The simulation system according to claim 11, wherein the front end operates at a noise floor range of 96–435 nW at 13.5 dB SNR.

26. The simulation system according to claim 1, wherein said at least one receiver includes multiple detectors.

27. The simulation system according to claim 4, wherein at least one of the receivers includes multiple detectors.

28. The simulation system according to claim 1, wherein said data communication rate is 1,006 Mbps.

29. The simulation system according to claim 4, wherein said data communication rate is 1,006 Mbps.

* * * * *